(12) United States Patent
Yaeger

(10) Patent No.: US 6,377,424 B1
(45) Date of Patent: *Apr. 23, 2002

(54) SHOCK-TOLERANT HEAD GIMBALING ASSEMBLY FOR A DISC DRIVE HAVING REDUCED DISC SPACING

(75) Inventor: John R. Yaeger, Sunnyvale, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,457

(22) Filed: Jan. 15, 1998

Related U.S. Application Data

(60) Provisional application No. 60/035,009, filed on Jan. 15, 1997.

(51) Int. Cl.[7] .............................................. G11B 17/00
(52) U.S. Cl. ..................................................... 360/245
(58) Field of Search ................................. 360/103, 104, 360/105, 106, 245.7, 245.3, 245.4, 246.2, 246.4, 245

(56) References Cited

U.S. PATENT DOCUMENTS

| | | | | |
|---|---|---|---|---|
| 4,876,623 A | * | 10/1989 | Takedado | 360/104 |
| 5,003,419 A | * | 3/1991 | Takedado | 360/104 |
| 5,003,420 A | * | 3/1991 | Hinlein | 360/104 |
| 5,459,921 A | * | 10/1995 | Hudson et al. | 360/104 |
| 5,491,597 A | * | 2/1996 | Bennin et al. | 360/104 |
| 5,936,799 A | * | 8/1999 | Kuratomi | 360/97.03 |

FOREIGN PATENT DOCUMENTS

| | | | |
|---|---|---|---|
| JP | 58-100274 | * | 6/1983 |
| JP | 3-12079 | * | 1/1991 |
| JP | 5-81805 | * | 4/1993 |

* cited by examiner

*Primary Examiner*—David Davis
(74) *Attorney, Agent, or Firm*—Derek J. Berger; Jonathan E. Olson; Shawn B. Dempster

(57) ABSTRACT

A head and gimbal assembly ("HGA") for supporting a pair of read/write heads at a desired fly height above a pair of adjacent discs. The HGA includes a rigid support arm, and a pair of thin, sheet metal suspensions mounted on opposed surfaces of the support arm. An end of each of the suspensions extends beyond an end of the support arm. These overhanging end portions include cutout sections defining a pair of back-to-back gimbals on which the read/write heads may be mounted. The suspensions may additionally include electrical connectors etched into the surface for transferring electrical signals between the read/write heads and the control electronics of the disc drive. In operation, a single HGA may be located between two adjacent discs, so that one of the heads on the HGA performs read/write operations on one of the two adjacent discs, and the other of the heads performs read/write operations on the other of the two adjacent discs. The HGA preferably supports the heads so that they exert little or no force against the discs.

13 Claims, 3 Drawing Sheets

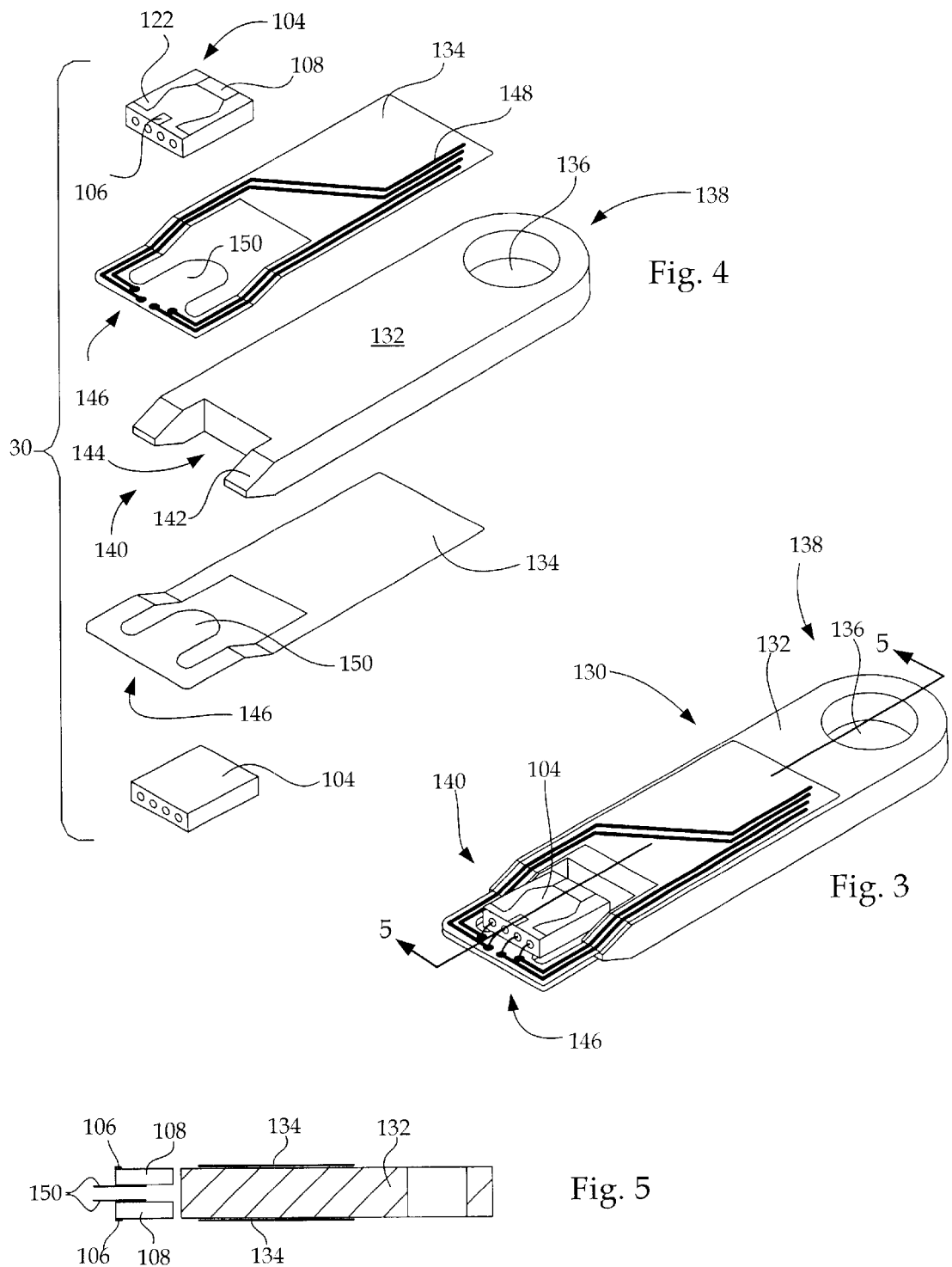

US 6,377,424 B1

SHOCK-TOLERANT HEAD GIMBALING ASSEMBLY FOR A DISC DRIVE HAVING REDUCED DISC SPACING

CLAIM OF PRIORITY

This application claims the benefit of U.S. Provisional Application No. 60/035,009 filed Jan. 15, 1997.

BACKGROUND OF THE INVENTION

1. Field of the Invention

The present invention relates to disc drives, and in particular to a head and gimbal assembly having a small thickness to thereby allow a small spacing between hard discs in a disc drive.

2. Description of Related Art

Conventional disc drives for use in work stations, personal computers, and portable computers are required to provide a large amount of data storage within a minimum physical space. In general. Winchester-type disc drives operate by transferring data between read/write transducing heads and one or more rotating magnetic storage discs. Positioning of the heads at the desired location over respective data tracks on the discs is accomplished by an actuator assembly coupled to control electronics. The electronics control rotation of the discs, positioning of the actuator assembly and the read/write functions of the heads.

Greater demands are being placed on disc drives by (1) the use of multi-user and/or multi-tasking operating systems, (2) work stations which provide an operating environment requiring the transfer of large amounts of data to and from a hard disc and/or large numbers of disc accesses to support large application programs or multiple users, (3) the present popularity of notebook and laptop computers, and (4) the continuing trend toward higher performance microprocessors. All such systems require a hard drive having high-capacity storage capability, while occupying a minimum of space within the host computer. In order to accommodate these demands, there is a need to produce a smaller hard disc drive which at the same time has an increased storage capacity. For such applications, single drive capacities on the order of several gigabytes are common.

An important determinant in the storage capacity of a disc drive is the flying height of the transducing heads above the rotating disc. Read/write transducing heads are typically mounted in a head slider. In conventional Winchester-type hard drives, once the storage disc achieves a certain angular velocity after start-up of the drive, a cushion of circulating air above the surface of the disc forces the head slider and read/write head up off the surface of the disc to thereby achieve a flying height. As long as the disc maintains a certain minimal rotational velocity, the head slider rides on this cushion of air above the disc surface. Having very low flying heights offers several advantages, primary among them is that flying the head very close to the disc surface allows for a high data bit density (i.e, the number of data bits per inch on a data track). The greatest data bit density would be obtained where the transducing head rides in contact with the storage disc. However, the contact of the head and head slider with the disc surface would result in damage to the head and/or disc in an unreasonably short period of time. Thus, there has been an industry wide push to decrease the height at which read/write heads are maintained over the disc surface without actually riding in contact with the disc surface. In the 1960's flying heights were commonly about 100 microinches ($\mu"$). At present, technological advances in read/write heads and disc drive design have allowed the reduction of flying heights to around 1 $\mu"$ in commercially viable disc drives.

FIG. 1 shows a conventional actuator assembly 10 for supporting read/write heads 12 with respect to discs 14. In particular, heads 12 are supported on flexures 16, which are in turn mounted on load beams 18. The load beams 18 are attached to an actuator arm 20, which is attached to a voice coil motor (not shown) for pivoting the actuator assembly about an axis 19 to position the heads 12 over the desired data tracks on the discs 14. The load beams 18 in conventional actuators are provided to exert a force or load to bias the heads 12 toward the surfaces of discs 14. During operation of the drive, the force of the load beams 18 oppose and counteract the force of the cushion of air under the sliders so that the heads reach an equilibrium state at the desired flying height.

It is an important function of flexures 16 to provide a gimbaling action which allows the heads 12 to fly flat over the discs, i.e, to orient the surface of the heads 12 so that they are generally parallel to the discs while the discs are rotating. Toward this end, flexures 16 typically include a tongue provided at an angle with respect to the main body of flexure. The angle of the tongue with respect to the flexure is provided to compensate for the angle that the load beam 18 forms with respect to the disc surface. When heads 12 are mounted to the flexure tongue, the heads 12 are generally parallel to the surface of the discs 14.

Even as 2½ inch form factor disc drives were introduced in the market place in the early 1990s, disc drive manufacturers were in the process of designing a 1.8 inch form factor disc drive. However, owing in part to the large memory requirements of Windows®-based applications, 1.8 inch form factor disc drives have not yet gained wide spread acceptance, as these drives have conventionally not had sufficient hard disc storage capacities to meet customer demands. One limitation to the storage capacities of 1.8 inch form factor disc drives, and disc drives in general, is that the above-described configuration of conventional actuator assemblies requires a minimum spacing ($S_{mm}$ in FIG. 1) between adjacent hard discs. This distance in conventional 1.8 inch form factor drives is approximately 60 to 80 mils. A smaller spacing between the discs would not leave sufficient room for the load beams, flexures and heads to fit in between adjacent discs.

Industry standards have dictated general dimensions for particular drive form factors. For example, the height of 1.8 inch form factor drives is generally no more than about 0.25 inches. It would of course be advantageous to fit more hard discs within a particular form factor to thereby increase the drive storage capacity. However, the disc spacing necessitated by conventional actuator assemblies has been a significant limitation in the number of discs which may be placed within a particular form factor disc drive.

SUMMARY OF THE INVENTION

It is therefore an advantage of the present invention to provide an actuator assembly capable of providing read/write transducing heads on juxtaposed surfaces of adjacent discs so that the discs may be located a small distance from each other.

It is a further advantage of the present invention to increase the number of hard discs which may be located within a disc drive without increasing the height of the disc drive.

It is another advantage of the present invention to provide a suspension having a zero or near zero gram loading of the heads against the hard discs.

It is a still further advantage of the present invention to reduce the number of head suspension components, and to simplify the fabrication process, in comparison to conventional actuators.

It is another advantage of the present invention to reduce the potential for shock damage to the heads in comparison to conventional actuators.

It is a still further advantage of the present invention to reduce the potential for a head slider to disadvantageously rotate about a longitudinal axis of the slider while the head is flying above a rotating disc.

These and other advantages are provided by the present invention which in preferred embodiments relates to disc drive including a novel head and gimbal assembly ("HGA") for supporting a pair of read/write heads at a desired fly height above a pair of adjacent discs. The HGA includes a rigid support arm, and a pair of thin, sheet metal suspensions mounted on opposed surfaces of the support arm. An end of each of the suspensions extends beyond an end of the support arm. These overhanging end portions include cutout sections defining a pair of back-to-back gimbals on which the read/write heads may be mounted. The suspensions may additionally include electrical connectors etched into the surface for transferring electrical signals between the read/write heads and the control electronics of the disc drive.

In operation, a single HGA may be located between two adjacent discs, so that one of the heads on the HGA performs read/write operations on one of the two adjacent discs, and the other of the heads performs read/write operations on the other of the two adjacent discs. The HGA preferably supports the heads so that they exert little or no force against the discs. This allows the load beam found in conventional actuator suspensions to be omitted from the present invention. Upon rotation of the discs, the suspensions flex slightly as necessary so as to support the heads on an air bearing at a desired flying height.

BRIEF DESCRIPTION OF THE DRAWINGS

The present invention will now be described with reference to the drawings, in which:

FIG. 3 is a perspective view of a head gimbaling assembly according to the present invention;

FIG. 4 is an exploded perspective view of the head gimbaling assembly shown in FIG. 3; and FIG. 5 is a cross-sectional side view of a head gimbaling assembly according to the present invention through line 5—5 of FIG. 3.

DETAILED DESCRIPTION

The present invention will now be described with reference to FIGS. 2 through 5 which in general relate to a head gimbaling assembly allowing a pair of read/write transducers to be positioned between juxtaposed surfaces of a pair of closely spaced storage discs. The disc drive described herein includes a hard disc assembly incorporating various numbers of hard discs and utilizing Winchester technology. It is understood that the disc drive of the present invention may utilize other types of discs, for example, optical discs, and other read/write technologies, such as for example lasers. In a preferred embodiment, the present invention may be utilized in a so-called 1.8 inch form factor disc drive, which includes hard discs having a diameter of approximately 1.8 inches. However, it is understood that the present invention may be used with larger or smaller form factor disc drives.

Figure 1:
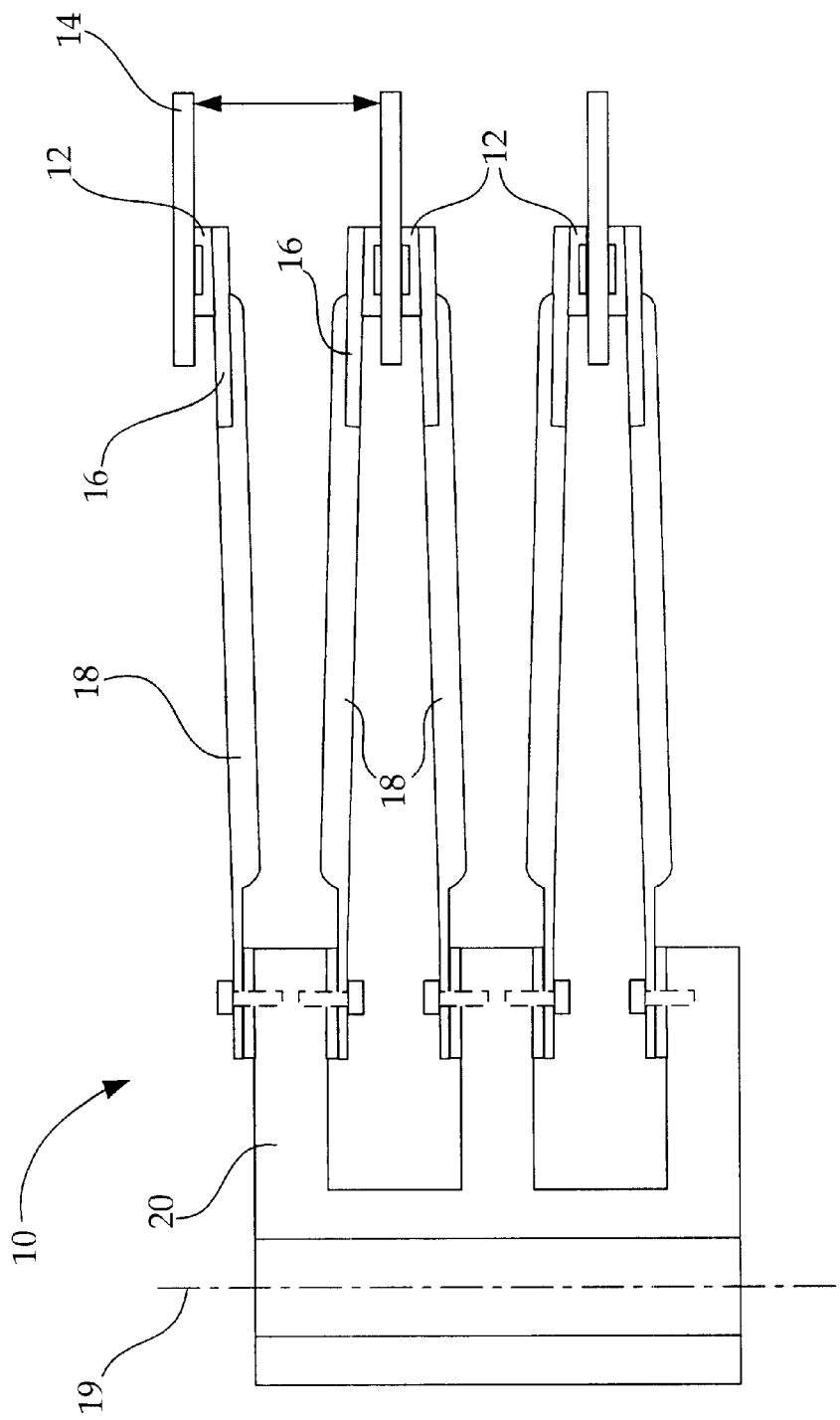
FIG. 1 is a side view of a conventional actuator assembly positioning a plurality of read/write transducing heads on juxtaposed surfaces of adjacent discs.
Figure 2:
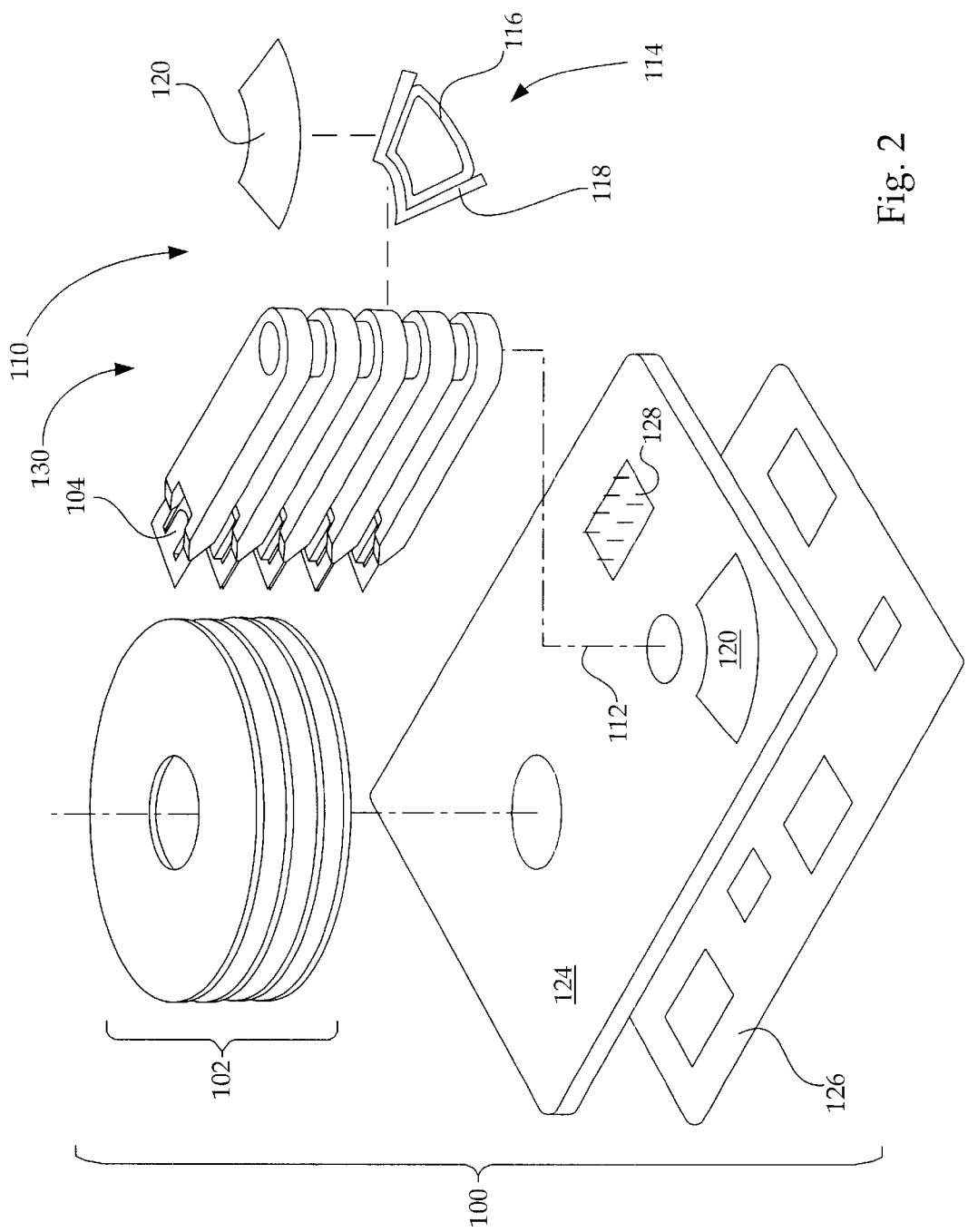
FIG. 2 is a perspective view of a disc drive including an actuator assembly having the head gimbaling assembly according to the present invention.

Referring now to FIG. 2, there is shown a disc drive 100 including a plurality of hard discs 102 and a plurality of read/write heads 104, one head 104 per disc surface. Each read/write head 104 includes a transducer 106 mounted to a slider 108. The slider 108 is in turn supported on an actuator assembly 110 explained in greater detail below. The heads 104 may utilize inductive transducers, such as for example those manufactured by Read-Rite, 345 Los Coches, Milpitas, Calif. It is understood that the type of read/write transducer used is not critical to the present invention, and other head technologies, such as magneto-resistive (MR) transducing elements, may be used in alternative embodiments of the invention.

The actuator assembly 110 is pivotally mounted so as to pivot around an axis 112 in response to a force exerted on the actuator assembly by voice coil motor 114 at a back end of the actuator assembly. The voice coil motor may include a voice coil 116 mounted between a pair of arms 118 extending from the actuator assembly, and one or two permanent magnets 120 mounted above and/or below the voice coil. It is understood that the configuration of the voice coil motor is not critical to the present invention, and may vary in alternative embodiments. For example, although a rotary actuator is disclosed, the present invention may operate with a linear actuator in alternative embodiments.

As is known in the art, during operation of the drive 100, discs 102 are rotated by spin motor (not shown) and actuator assembly 110 pivots the read/write heads 108 across the surfaces of the discs so that data is transferred between the read/write heads and the discs in a plurality of concentric data tracks. Slider 108 includes a pair of rails 122 (FIG. 4) along the length of the slider, which rails are provided to support the transducers on an air bearing a small distance above the surface of the discs 102 as the discs rotate. In a preferred embodiment, each of the heads may have a flying height of between one to four microinches, and optimally about 1.5 microinches.

The above-described head and disc assembly ("HDA") may be mounted within a base 124 and cover (not shown) forming an enclosure of known construction to shield the HDA against particulates in the surrounding environment. Control electronics 126 may be affixed to the enclosure and connected to the HDA via a conventional header 128. The control electronics may be used to control rotation of the discs, positioning of the actuator assembly, and transfer of information between the transducers and the discs.

Referring now to FIGS. 2–5, in addition to the voice coil motor 114, the actuator assembly according to the present invention includes a head gimbaling assembly ("HGA") 130. The HGA 130 includes a support arm 132, and a pair of suspensions 134 on opposed surfaces of the support arm 132. The support arm 132 may be formed of a rigid, lightweight material such as for example aluminum or aluminum alloy, and may be formed by casting or machining. It is understood that other materials may be used for support arm 132, such as various polymers and other metals, and that the arm may be formed by processes other than casting or machining, in alternative embodiments of the invention. An aperture 136 is formed near a first end 138 of the support arm 132, through which is received an actuator post (not shown) pivotally mounted to the base 124 of the disc drive. The actuator post allows the HGA 130 and heads 104 to pivot across the surfaces of the discs 102 to position the heads 104 as desired with respect to data tracks on the discs.

The support arm 132 includes a second end 140 opposite the first end 138, which second end includes a pair of tapered sections 142 near opposite sides of the arm 132, and a central cutout section 144 in between the tapered sections 142. As will be explained in greater detail below, a pair of read/write heads 104, each including a transducer 106 and a slider 108, may be secured partially within the cutout section 144. It is understood that the second end 140 of the arm 132 may have various configurations to hold the heads 104 in alternative embodiments of the invention.

The suspensions 134 are preferably formed of a sheet of thin, flexible stainless steel, cut from sheet stock. It is understood that the suspensions may be formed from other materials, such as for example aluminum or aluminum alloy, and by other processes in alternative embodiments of the invention. The width of the suspensions are preferably similar to or less than the width of the support arm. The thickness of the support arm 132 and two suspensions 134 together may be approximately 20 mils, but this thickness may vary in alternative embodiments of the invention. An end 146 of the suspensions may extend beyond the second end 140 of the support arm for purposes explained hereinafter.

A conventional epoxy, such as for example ABLESTIK 868-7, manufactured by Ablebound Corp. may be used to attach the suspensions 134 to the support arm 132. Other epoxies or adhesives, and other attachment means, such as welding or UV bonding, may be used in alternative embodiments. The epoxy may be applied over all surfaces of the suspensions and support arm in contact with each other. Alternatively, the epoxy may be applied in discrete points to reduce the effects of uneven thermal expansion. The coefficients of thermal expansion of the suspensions and support arm are preferably similar to each other to further reduce the effects of uneven thermal expansion.

As best shown in FIGS. 4 and 5, each of the suspensions include a cutout section near the end 146 so as to define a gimbal 150. The gimbals on respective suspensions are located back-to-back within the cutout section 144 in the support arm. Read/write heads 104 may be mounted on each gimbal 150 (one such head shown on FIG. 3), so that the bottom of the two sliders 108 mounted on a single support arm 132 face in opposite directions. A conventional epoxy, such as for example ABLESTIK 868-7, manufactured by Ablebound Corp. may be used to attach the heads 104 to the gimbals. Other bonding methods, such as UV bonding, may be used to affix the heads 104 to the gimbals 150. The gimbals are preferably oriented to hold the heads 104 substantially parallel to the surfaces of the discs 102.

The suspensions may include electrical connectors 148 etched into their surface. Such electrical connections are known and commercially available in TSA™ suspension assemblies from Hutchinson Technology Incorporated, 40 West Highland Hutchinson, Minn. 55350. The electrical connectors 148 may transfer signals between the transducers 106 and the control electronics 126 mounted adjacent the base of the disc drive. The electrical connectors 148 may be attached to the transducers by conventional wire bonding techniques.

In operation, a single HGA 130 may be located between two adjacent discs 102, so that one of the heads 104 on the HGA performs read/write operations on one of the two adjacent discs, and the other of the heads 104 performs read/write operations on the other of the two adjacent discs. Upon rotation of the discs, the suspensions 134 flex slightly as necessary to support the heads 104 on an air bearing at a desired flying height.

As explained in the Background of the Invention section, prior art suspensions were gram loaded so as to bias the slider against the surface of the disc. Conventional wisdom was that suspensions had to be loaded to better enable the drive to withstand shock. Shocks which cause the head to move initially downward toward the disc are in general not a significant concern because, at the normal flying height of the head above the disc, the head cannot generally build up a large momentum down onto the disc to do significant damage to the disc. On the other hand, where a severe shock causes the heads to initially fly upward away from the discs, the heads will rebound back downward toward the disc with a relatively large momentum, and will slap down onto the discs, often with one corner of the slider impacting the disc first. A gram loaded suspension which biases the heads towards the discs reduces the amount with which the heads fly upward away from the discs upon shock, and consequently reduce the frequency with which the heads contact the discs upon rebounding back downward. Higher gram loading of the suspensions was thought to offer greater immunity to operating shock.

Conversely, according to the present invention, the load beam of conventional suspensions may be omitted, and the HGA 130 may support the heads so that they exert substantially little or no force against the disc. The ability of the present invention to operate without a loaded suspension is in part due to the compact space in which the read/write heads 104 are located. Namely, upon receipt of a shock during disc drive operation, each read/write head is prevented from flying up away from its corresponding disc surface to any large degree because it is positioned so closely (e.g., about 0.2 mils) from the other read/write head on that support arm. Thus, as the head can never fly upward too far away from the disc surface upon a shock to the drive, it cannot rebound downward against the disc surface with any appreciable momentum. As such, little or no gram loading of the head against the surface of the disc is necessary with the HGA 130 according to the present invention.

It is understood that the HGA 130 may bias the heads 104 toward the surfaces of the discs 102 in alternative embodiments of the invention. Moreover, the HGA 130 may bias the heads 104 away from the surfaces of the discs 102 in further alternative embodiments of the invention. In this further alternative embodiment, sliders of known construction may generate a low pressure under portions of the head upon disc rotation, to thereby draw the read/write transducer closer to the disc to achieve the desired fly height.

The stiffness with which the head is held by the suspensions 134, and consequently the degree to which the head will be affected by the air bearing built by the rotating disc, may be varied by varying the stiffness of the suspensions 134. Additionally the stiffness may be varied by varying the location at which the bonding material is applied between the suspensions 134 and the support arm 132. That is, if epoxy is only applied between a suspension 134 and the support arm at a location distal from the end 146 of the HGA, the HGA will be more flexible than if epoxy were applied between the suspension and support arm at a location near to the HGA end 146.

The HGA according to the present invention provides several advantages. First, the omission of the load beams found in conventional suspensions, as well as the location of two heads on a single support arm, allows a reduction in the thickness of the suspension for a pair of heads in comparison to conventional actuators. Consequently, the discs may be placed closer together and more discs may be located in the disc drive without increasing the overall height of the drive. Using the HGA according to the present invention allows a spacing of approximately 30 mils between adjacent discs. Such a spacing allows as many as four discs to be located within a 1.8 inch form factor drive having a height of 0.25 inches.

The provision of two heads on a single HGA 130 also reduces the number of parts and simplifies drive fabrication in comparison to conventional actuators, which utilize two separate suspensions to support two heads. Moreover, the suspensions according to the present invention may be firmly affixed to the rigid support arm very near to the location where the heads are mounted. This fact, together with the reduced spacing between discs, reduces the potential for shock damage to the heads. The stiffness and close spacing between the discs also reduces the potential for the sliders to "roll" during operation, i.e., for the sliders to disadvantageously rotate about a longitudinal axis of the slider while supported on the air bearing.

Although the HGA according to the present invention has been described thus far as including a support arm and suspensions that are assembled together, in an alternative embodiment of the invention, it is understood that the HGA may alternatively comprise a single member which performs the functions of both the support arm 132 and the suspensions 134. In this embodiment, the single member would be substantially rigid along its length, and include a pair of gimbals, mounted back to back as described above with respect to gimbals 150. The gimbals according to this alternative embodiment would be capable of flexibly supporting a pair of heads 104 on an air bearing at the desired fly height upon rotation of the discs.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

I claim:

1. A shock-tolerant head gimbaling assembly suitable for operation between two adjacent data storage discs, comprising:
   a movable rigid support arm having a cutout section;
   a pair of flexible suspensions each extending from the rigid support arm; and
   first and second transducer heads arranged back-to-back each configured to interact with a respective one of the data storage discs, each transducer head coupled to a respective one of the suspensions and extending into the cutout section, the first transducer head positioned to snub a shock-induced motion of the second transducer head so as to reduce a risk of damage to the transducer heads and data storage discs.

2. The assembly of claim 1 in which the heads are separated by a gap of about 0.2 mils while the heads are operating.

3. The assembly of claim 1 in which each suspension consists of a metal layer having a cutout section.

4. The assembly of claim 1 in which each suspension comprises a gimbal, and in which the suspensions are configured so that the gimbals are separated by a gap thinner than the support arm.

5. The assembly of claim 1 in which each suspension is about as wide as the support arm.

6. The assembly of claim 1 in which each suspension extends beyond the end of the support arm.

7. The assembly of claim 1 in which the two suspensions are firmly affixed onto the rigid support arm.

8. The assembly of claim 1 in which the support arm and the two suspensions have a combined thickness of about 20 mils.

9. The assembly of claim 1 in which the support arm is formed of a material about as rigid as cast aluminum.

10. The assembly of claim 1 in which the support arm is configured to pivot so that the heads move across the data storage discs to a desired radial position.

11. The assembly of claim 1 in which the suspensions do not include load beams.

12. A shock-tolerant disc drive comprising:
    a rotatable stack comprising a plurality of closely-spaced data storage discs defining one or more pairs of adjacent hard discs, each pair further comprising an upper disc and a lower disc;
    a movable actuator assembly comprising a rigid support arm extending between each pair of adjacent hard discs;
    a pair of flexible suspensions extending from each of the support arms; and
    an upper transducer heads and a lower transducer head arranged back-to-back on each pair of flexible suspensions, each of the two transducer heads coupled to a respective one of the suspensions, in which each suspension provides a near-zero gram-loading of the upper transducer head against the upper storage disc and of the lower transducer head against the lower storage disc, and each of the two transducer heads being positioned to snub a shock-induced motion of the other of the transducer heads, so as to reduce a risk of damage to the transducer heads and data storage discs.

13. The disc drive of claim 12 in which the actuator assembly does not include load beams.

* * * * *